Dec. 1, 1936.  H. H. MERCER  2,062,816
VALVE MECHANISM
Filed March 19, 1930
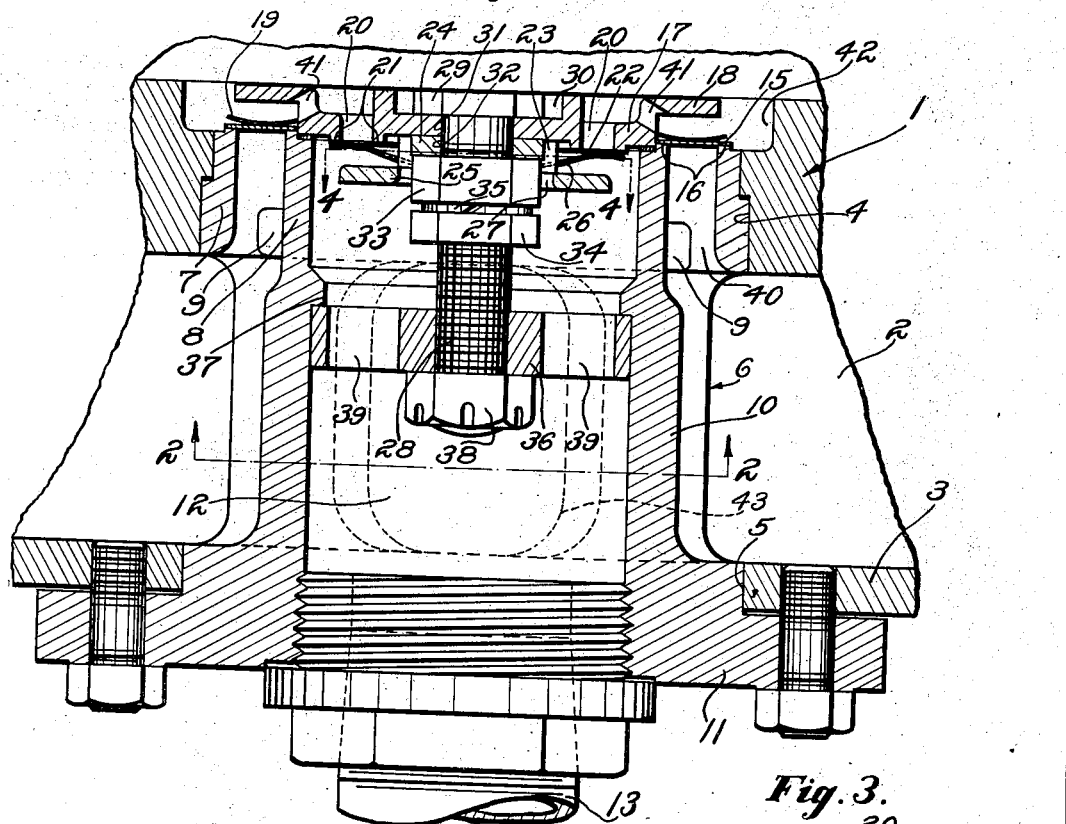
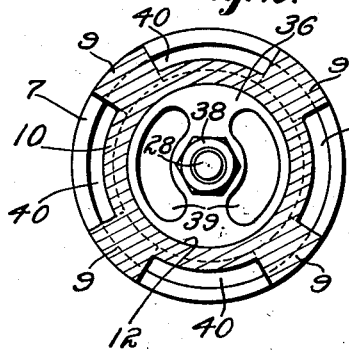
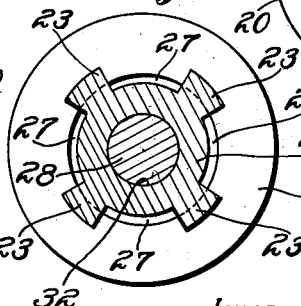
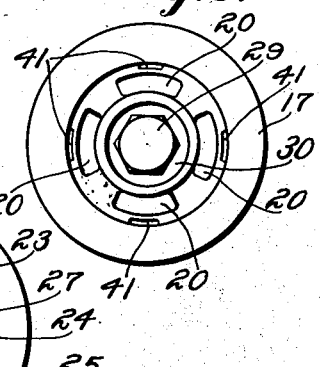
INVENTOR:
HENRY H. MERCER.
BY Louis A. Maxson.
ATT'Y.

Patented Dec. 1, 1936

2,062,816

UNITED STATES PATENT OFFICE 2,062,816

VALVE MECHANISM

Henry H. Mercer, Claremont, N. H., assignor to Sullivan Machinery Company, a corporation of Massachusetts Application March 19, 1930, Serial No. 437,229

21 Claims. (Cl. 277—70)

This invention relates to valve mechanisms, and more particularly to inlet and discharge valves for a reciprocating pump such as an air compressor.

An object of my invention is to provide an improved combined inlet and discharge valve mechanism which will have the advantage not only of presenting relatively small clearance space, but which also will be relatively simple in construction and arrangement of parts, whereby the cost of manufacture and maintenance thereof may be reduced to a minimum and the accessibility to, and removal of, parts is greatly facilitated. A further object of my invention is to provide a valve of the type just mentioned wherein the movable valve elements are of the relatively thin annular plate valve type with the inlet and discharge valve disposed substantially in a common transverse plane and with the inner valve seat member carrying the guard for the outer valve. Further objects and advantages will be more apparent to those skilled in the art from the following description of the accompanying drawing in which, Fig. 1 is a sectional view of the valve mechanism placed in position in a fragmentary section of a cylinder.

Fig. 2 is a transverse section taken substantially on line 2—2 of Fig. 1.

Fig. 3 is a plan view looking down upon the valve mechanism from the top of Fig. 1.

Fig. 4 is a transverse section taken substantially on the line 4—4 of Fig. 1 with the valve spring omitted.

In the illustrative embodiment of my invention I have shown the same applied to any usual type of piston cylinder generally indicated 1. The cylinder is provided with an inlet passage 2 formed between the cylinder wall proper and an outer wall 3, the walls 1 and 3 herein being provided with a stepped bore 4 and a straight bore 5 to receive a combined valve seat and retaining member generally indicated at 6. The valve seat portion has concentric valve seat portions 7 and 8 held in radially spaced relation by a series of radial ribs 9. The inner seat forming member 8 extends axially as at 10 to form a retaining sleeve which at its outermost end is provided with a suitable flange 11 secured to the outer wall 3 as by bolts or other usual suitable means. The retaining sleeve 10 performs the additional function of providing a discharge passage 12 leading to a discharge pipe 13 suitably connected to the bore 12 as by a threaded collar or other usual means. An inlet valve 15 of the relatively thin annular plate valve type is adapted to seat upon the inlet valve seats 16 formed upon the valve seat portions 7 and 8, this valve being guided by a valve guard 17 having a usual annular portion 18 between which and the valve 15 is disposed a well-known type of transversely flexed annular plate spring 19. The guard 17 constitutes, in addition, a discharge valve seat member in that a series of discharge ports 20 are disposed therein and terminate adjacent concentric annular valve seating surfaces 21 with which a relatively thin annular plate valve element 22 is adapted to cooperate. The discharge valve 22 is guided by the surfaces of axially and radially extending ribs 23 preferably equally spaced about the valve axis as shown in Fig. 4, these ribs being secured to a central transverse portion 24 and to a valve supporting annular flange 25. All of these elements together form the valve guard for the discharge valve 22 between which and the guard is disposed a spring 26 substantially similar in form to the inlet valve spring but of smaller diameter. It will also be noted that the discharge valve guard is provided with a circular port opening or openings 27 which are provided, by the provision of the radially and axially extending ribs 23 for holding the annular flange 25 in spaced relation to the central portion 24. In addition ample discharge passage area is provided around the outer edge of the valve guard. Free communication both radially inwardly and outwardly is therefore provided for the discharge passage 12 as fluid is pumped from the cylinder and through the ports 20.

The improved means for holding the inlet and discharge valve guards and associated elements in rigid relation comprises a central bolt 28 having a relatively flat and thin head 29 disposed in a suitable recess 30 formed in the discharge valve member. The central bolt passes through axial openings 31 and 32 formed in the inlet valve seat member and the discharge guard, these two elements being clamped together by a nut 33 which is held preferably by a lock nut 34 or other suitable locking means including a spring lock washer 35. The bolt stem extends through a transverse central holding member 36 disposed within the discharge passage 12 and seated against a suitable annular flange 37, thus permitting a nut 38 to pull the various elements in rigid relation. A series of ports 39 permit discharge of fluid through the discharge valve mechanism into the discharge pipe 13.

The inflow of air, as is readily seen, passes through the passage 40 formed between spaced portions 7 and 8 thereby to lift the inlet valve 15 and permit flow of fluid to the cylinder, both on the outside of the valve and inwardly thereof as through a series of ports 41. 43 indicates the initial air intake to chamber 2.

From the foregoing description it is seen that my improved arrangement permits a relatively small clearance space due not only to the particular arrangement of parts, but also to the provision of a recess 42 in the cylinder head and within which the inlet valve guard is disposed; it also being noted that the entire valve structure may be bodily removed and another one inserted, and that the valve retaining member eliminates the necessity for special discharge passages due to the provision of the axial discharge passage 12. Also, the inlet and discharge valve guards may be assembled as a unit and readily inserted or removed merely by removing the central nut 38.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A combined inlet and discharge valve means comprising concentrically arranged valve mechanisms, the outer valve mechanism including an outer valve seat member having annularly arranged flow passages therethrough and annular concentric valve seats respectively surrounding and lying to the inside of said annularly arranged flow passages, an annular plate valve adapted to cooperate with said seats, a valve guard for said valve, and a spring interposed between said valve and said guard, and said inner valve mechanism comprising flow passages formed in said guard and annular concentric valve seats respectively surrounding and lying to the inside of said passages, an annular plate valve for said last mentioned valve seats, a valve guard for said inner valve, a spring interposed between said inner valve and said inner guard, a central bolt for securing both of said guards together as a unit which is separable as a whole from the outer valve seat member, and means cooperating with said bolt and said outer valve seat member to hold said guard unit in fixed relation thereto.

2. A combined inlet and discharge valve means comprising concentric valve mechanisms, the outer valve mechanism including an outer valve seat member having flow passages therethrough and annular concentric valve seats bracketing said passages, an annular plate valve for said annular seats, a member providing a guard for said plate valve, and a spring interposed between said valve guard and valve, the inner valve mechanism being supported by the outer valve seat member and including a valve seat portion integral with the member forming a valve guard for said outer valve and concentric annular valve seats bracketing the flow passages in said valve seat portion, an annular plate valve for said seats, a guard for said inner valve, and a spring interposed between said inner guard and said inner valve, and means for holding said inner valve mechanism on said outer valve seat member including a transverse member cooperating with said outer valve seat member in opposed relation to the inner valve mechanism and spaced bodily from the latter, and a bolt extending through said transverse member for pulling said transverse member and inner valve mechanism towards each other to maintain the same in assembled relation with respect to said outer valve seat member, said transverse member being separable from both the seat and guard elements of the inner valve mechanism by movement longitudinally of said bolt.

3. A combined inlet and discharge valve means comprising concentric inlet and discharge valve mechanisms, the outer mechanism being an inlet mechanism and the inner mechanism being a discharge mechanism, said outer mechanism including a member providing an inlet valve seat having flow passages therethrough, an annular plate valve for controlling said passages, said inner discharge valve mechanism being supported by said valve seat member and also having passages and an annular plate valve for controlling said passages, said inner valve mechanism including an element forming a valve guard for the outer valve, a valve guard for said inner discharge valve, said annular plate valves being disposed relatively close to a common transverse plane, and means for holding said inner and outer valve mechanisms in operative relation including a substantially circular member distinct and separable from both of said valve guards and disposed transversely of and engaging at points remote from its central portion said outer valve seat member and arranged in opposed relation to said inner valve mechanism, and a bolt traversing the center of said transverse member for clamping at least a portion of said outer valve seat member between the inner valve structure and said transverse member.

4. In a combined pump inlet and discharge valve means comprising concentric valve mechanisms, means, including a combined valve seat and valve supporting member having a central discharge passage extending therethrough, providing inlet and discharge passages at one end of said member and valve seats surrounding said passages, and concentric annular plate valves engageable with said seats for controlling said passages, said plate valves lying relatively close to a common transverse plane, and the inner one of said valves being of smaller diameter than said central discharge passage and having its discharge side communicating with said central discharge passage and said central discharge passage conducting the discharging fluid passing said inner valve to the exterior of said valve mechanism.

5. The combination set forth in claim 4 further characterized in that said valve seat and valve supporting member is provided with an outer portion adapted for attachment to a cylinder and having provision for direct connection to a discharge connection.

6. The combination set forth in claim 4 further characterized in that said inner valve mechanism is removably held in position by the provision of a transverse holding member structurally distinct therefrom and disposed within said central discharge passage and engageable with a suitable abutment within the latter, and a holding bolt extending through said inner valve mechanism and transverse holding member.

7. A combined inlet and discharge valve means comprising concentric valve mechanisms, the outer valve mechanism including a valve holding member and, formed integrally with the latter, a valve seat member having flow passages therethrough, and further including an annular plate valve controlling said passages, said valve holding member having a radially closed, axially open discharge passage extending therethrough, and said inner valve mechanism controlling flow through said discharge passage and including a valve seat member having flow passages therethrough and a valve guard for said outer valve, an annular plate valve for controlling said inner flow passages, and, structurally distinct from said valve seat members and supported by the second mentioned one thereof, guarding and guiding means for said inner valve including an annular guard plate having supporting and valve guiding means, said valve guard and guiding means formed to provide spaces whereby fluid may flow substantially freely past the inner and outer edges of the inner plate valve when the latter is open including passageways formed inwardly of the outer edge of said guard, both of said annular plate valves being disposed relatively close to a common transverse plane.

8. A combined inlet and discharge valve means comprising cencentric valve mechanisms, the outer valve mechanism including an outer valve seat member having flow passages therethrough, concentrically arranged valve seats formed on said member and bracketing said passages, a plate valve adapted to cooperate with said seats, a valve guard for said valve, and a spring interposed between said valve and guard, and the inner valve mechanism comprising flow passages formed in said guard and terminating adjacent concentrically arranged valve seats formed on said guard and bracketing said second mentioned flow passages, a plate valve for said last mentioned seats, a valve guard for said inner valve, a spring interposed between said inner valve and its guard, a central imperforate bolt for securing both of said guards together as a unit, and means engaging said bolt and said outer valve seat member to hold said guard unit in fixed relation thereto and providing flow passages opening through its surface most remote from said guard unit.

9. A combined inlet and discharge valve means comprising concentric valve mechanisms, the outer valve mechanism including an outer valve seat member having flow passages therethrough and concentrically arranged valve seats formed on said member and bracketing said flow passages, and a valve for said seats, said inner valve mechanism being supported by said valve seat member and including a member forming a valve guard for the outer valve and providing a valve seat having flow passages therethrough and concentrically arranged valve seats bracketing said flow passages, a guard facing said last mentioned seats, a valve for said seats and a spring interposed between said valve guard and said valve, and means for holding said inner valve mechanism by the outer valve seat forming member including a transverse member distinct from said last mentioned guard and movable bodily relative thereto and engaging said outer valve seat member in opposed relation to the inner valve mechanism, and a bolt extending through said transverse member for pulling said transverse member and inner valve mechanism together in assembled relation.

10. A combined inlet and discharge valve mechanism comprising a valve seat member having flow passages therein, an annular plate inlet valve seated on said member for controlling fluid flow through said passages, a valve guard for said inlet valve, a spring interposed between said plate valve and guard, said valve guard having a valve seat and flow passages, an annular plate discharge valve seated on said valve guard seat for controlling fluid flow through the passages therein, a valve guard member for said discharge valve, a spring interposed between said latter guard member and said discharge valve, and devices for securing said valve guard members directly together as a rigid unit positionable while assembled in opposed relation with respect to said first valve seat member and for detachably holding said valve guard unit in fixed relation to said first valve seat member, said guard members being releasable as a unit from said first named valve seat member.

11. A combined inlet and discharge valve mechanism comprising a valve seat member having flow passages therein, an annular plate inlet valve seated on said member for controlling said flow passages, a combined valve guard and valve seat member secured to said first mentioned valve seat member, a spring interposed between said valve guard member and said inlet valve, said combined guard and valve seat member having flow passages therein, an annular plate discharge valve seated on said valve guard and seat member for controlling said flow passages therein, said inlet and discharge valve seats being arranged in a substantially common transverse plane, a valve guard secured to said combined valve guard and seat member and removable as a unit with the latter from said first mentioned valve seat member, and a spring interposed between said discharge valve and said latter guard member.

12. A combined inlet and discharge valve mechanism comprising a valve seat member having flow passages adjacent one end thereof, an inlet valve controlling said flow passages, a combined valve guard and seat member having flow passages therein, a spring interposed between said valve guard member and said inlet valve, a discharge valve controlling fluid flow through said passages in said guard member, a guard member secured to said combined valve seat and guard member and positionable within said first mentioned valve seat member through the end of the latter at which said flow passages are formed, a spring interposed between said latter valve guard and said discharge valve, and devices for holding said valve guard members directly together as a unit and for detachably securing said guard unit to said first mentioned valve seat member, said guard members being releasable as a unit from said first named valve seat member.

13. A combined inlet and discharge valve mechanism comprising a valve seat member having flow passages, an inlet valve controlling said flow passages, a combined valve guard and seat member having flow passages therein, a spring interposed between said valve guard member and said inlet valve, a discharge valve controlling fluid flow through said passages in said guard member, a guard member secured to said combined valve seat and guard member, a spring interposed between said latter valve guard and said discharge valve, and means for holding said valve guard members together as a unit and for securing said guard unit to said first mentioned valve seat member including a member engaging said first mentioned valve seat member and a bolt engaging said latter member and said guard unit for clamping the same together on said first mentioned valve seat member, tensioning of said bolt drawing said second mentioned guard member and said last mentioned member towards each other.

14. A combined inlet and discharge valve mechanism comprising a valve seat member having flow pasages, an inlet valve controlling said flow passages, a combined valve guard and seat member having flow passages therein, a spring interposed between said valve guard member and said inlet valve, a discharge valve controlling flow passages, an inlet valve controlling said guard member, a guard member secured to said combined valve seat and guard member, a spring interposed between said latter valve guard and said discharge valve, and means for holding said valve guard members together as a unit and for securing said guard unit to said first mentioned valve seat member including a transverse holding member engaging said first mentioned valve seat member and a bolt engaging said latter member and said guard unit for clamping the same together on said first mentioned valve seat member and drawing said second mentioned guard member towards said transverse holding member, said transverse holding member having flow passages formed therethrough.

15. A combined inlet and discharge valve mechanism comprising a valve seat member having inlet flow passages therein, an inlet valve controlling said passages, a combined valve guard and seat member secured to said first mentioned valve seat member, said combined valve guard and seat member having inlet flow passages and discharge flow passages, a discharge valve controlling said discharge flow passages, a guard for said discharge valve secured to said combined valve guard and seat member, and devices for securing said valve guard members directly together as a unit removable or insertable as a whole relative to said first mentioned valve seat member and for detachably securing said unit to said first mentioned valve seat member.

16. A combined inlet and discharge valve mechanism comprising a valve seat member having inlet flow passages, and a discharge flow passage extending axially therethrough, an inlet valve controlling said inlet flow passages, a combined valve guard and seat member secured to said first mentioned seat member and affording a guard for said inlet valve, said combined valve seat and guard member having discharge flow passages, a valve controlling said discharge flow passages, a guard member secured to said combined valve guard and seat member for said discharge valve, and means for securing said valve guard members together as a unit and for detachably securing said guard unit to said first mentioned valve seat member and including a holding member separate from both guard members and arranged within said axial discharge passage in said first mentioned valve seat member and a clamping element engaging said latter member and said guard unit.

17. A combined inlet and discharge valve mechanism comprising a valve seat member having inlet flow passages, and a discharge flow passage extending axially therethrough, an inlet valve controlling said inlet flow passages, a combined valve guard and seat member secured to said first mentioned seat member and affording a guard for said inlet valve, said combined valve seat and guard member having discharge flow passages, a valve controlling said discharge flow passages, a guard member secured to said combined valve guard and seat member for said discharge valve and at all points of less diameter than said discharge flow passage first mentioned, and means for securing said valve guard members together as a unit and for securing said guard unit to said first mentioned valve seat member and including a holding member arranged within said axial discharge flow passage in said first mentioned valve seat member and a clamping element engaging said latter member and said guard unit, said holding member having flow passages formed therein for permitting free fluid flow through said axial discharge flow passage.

18. A combined inlet and discharge valve unit comprising concentrically arranged valve mechanisms, the outer valve mechanism including an outer valve seat member having annularly arranged flow passages therethrough and annular concentric valve seats respectively surrounding and lying to the inside of said annularly arranged flow passages, an annular plate valve adapted to cooperate with said seats, a valve guard for said valve, and a spring interposed between said valve and said guard, and said inner valve mechanism comprising flow passages formed in said guard and annular concentric valve seats respectively surrounding and lying to the inside of said passages, an annular plate valve for said last mentioned valve seats, a valve guard for said inner valve, a spring interposed between said inner valve and said inner guard, a central bolt for securing both of said guards together as a unit which is separable as a whole from the outer valve seat member, and a member relative to which said inner valve guard is movable on dismantling the combined valve unit cooperating directly with the bolt and said outer valve seat member to hold said guard unit in fixed relation thereto.

19. A combined inlet and discharge valve means comprising concentric valve mechanisms, the outer valve mechanism including a valve seat member having flow passages therethrough and an annular plate valve controlling said passages, said inner valve mechanism including a valve seat member having flow passages therethrough and a valve guard portion for said outer valve, an annular plate valve for controlling said inner flow passages, and valve guarding and guiding means for said inner valve including an annular guard plate having supporting and valve guiding means, said valve guarding and guiding means, formed to provide spaces whereby fluid may flow substantially freely past the inner edge, as well as past the outer edge, of the inner plate valve when the latter is open including passageways formed inwardly of the outer edge of said guard, both of said annular plate valves being disposed relatively close to a common transverse plane and said valve guards being removable from said first mentioned seat member by movement in the same direction.

20. In a combined inlet and discharge valve mechanism, an internally bored member having a valve seat arranged outside its bore at one end, and a valve on said seat, a guard for said valve, another valve seat, the latter being opposite and communicating with said end of the bore, a valve for said last mentioned seat, a guard for said last mentioned valve insertable through said end of the bore to a position within the latter, a member spaced and structurally distinct from said last mentioned valve seat and traversed by flow passage means and having engagement with said internally bored member precluding passage from the other end thereof to the first mentioned end thereof, and tension means cooperating with said last mentioned member for drawing said second mentioned valve guard toward said last mentioned member.

21. In a combined inlet and discharge valve mechanism, an internally bored member having a valve seat arranged outside its bore at one end, and a valve on said seat, a guard for said valve, another valve seat, the latter being opposite and communicating with said end of the bore but having means precluding its passage through the latter, a valve for said last mentioned seat, a guard for said last mentioned valve insertable through said end of the bore to a position within the latter, means for securing said last mentioned guard to said second mentioned seat, a member traversed by flow passage means and having engagement with said internally bored member precluding its own passage from the other end thereof to the first mentioned end thereof, and tension means cooperating with said last mentioned member for drawing said second mentioned valve guard toward said last mentioned member.

HENRY H. MERCER.

CERTIFICATE OF CORRECTION.

Patent No. 2,062,816.                                              December 1, 1936.

HENRY H. MERCER.

It is hereby certified that error appears in the printed specification of the above numbered patent requiring correction as follows: Page 4, first column, line 5, claim 14, for "pasages" read passages; lines 10 and 11, same claim, strike out the words "flow passages, an inlet valve controlling" and insert instead fluid flow through said passages in; and that the said Letters Patent should be read with these corrections therein that the same may conform to the record of the case in the Patent Office.

Signed and sealed this 26th day of October, A. D. 1937.

(Seal)

Henry Van Arsdale,
Acting Commissioner of Patents.